US009258146B2

(12) United States Patent
Dournov et al.

(10) Patent No.: US 9,258,146 B2
(45) **Date of Patent: *Feb. 9, 2016**

(54) METHODS AND SYSTEMS FOR PROVIDING SECURE ACCESS TO A HOSTED SERVICE VIA A CLIENT APPLICATION

(75) Inventors: Pavel A. Dournov, Redmond, WA (US); Sumeet Updesh Shrivastava, Kirkland, WA (US); Vaidyanathan Arunachalam, Redmond, WA (US); Donna L. Whitlock, Seattle, WA (US); Anthony J. Yeates, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 109 days.

This patent is subject to a terminal disclaimer.

(21) Appl. No.: 13/314,615

(22) Filed: Dec. 8, 2011

(65) Prior Publication Data

US 2012/0084394 A1 Apr. 5, 2012

Related U.S. Application Data

(63) Continuation of application No. 10/744,920, filed on Dec. 23, 2003, now Pat. No. 8,099,503.

(51) Int. Cl.
*G06F 15/16* (2006.01)
*H04L 12/64* (2006.01)

(52) U.S. Cl.
CPC .................................. *H04L 12/6418* (2013.01)

(58) Field of Classification Search
CPC .............. H04L 12/6418; G06F 21/604; G06F 21/6218
USPC .................................................. 709/217, 225
See application file for complete search history.

(56) References Cited

U.S. PATENT DOCUMENTS

| | | | | |
|---|---|---|---|---|
| 6,182,142 | B1 * | 1/2001 | Win et al. | 709/229 |
| 6,205,480 | B1 * | 3/2001 | Broadhurst et al. | 709/225 |
| 6,453,353 | B1 | 9/2002 | Win et al. | |
| 6,490,624 | B1 | 12/2002 | Sampson et al. | |
| 6,647,531 | B2 | 11/2003 | Isaac et al. | |
| 6,985,953 | B1 | 1/2006 | Sandhu et al. | |
| 7,139,758 | B1 | 11/2006 | Laws et al. | |
| 7,164,685 | B2 | 1/2007 | Atamaniouk | |
| 7,221,935 | B2 | 5/2007 | Barriga-Caceres et al. | |
| 7,225,464 | B2 | 5/2007 | Satyavolu et al. | |
| 7,237,118 | B2 | 6/2007 | Himberger et al. | |

(Continued)

OTHER PUBLICATIONS

Samar, V. "Single Sign-On Using Cookies for Web Applications," In Proc. of 8th IEEE Workshop on Enabling Technologies: Infrastr. for Collab. Enterprises, 1999, pp. 158-163.

(Continued)

*Primary Examiner* — Shripal Khajuria
*Assistant Examiner* — Farhad Ali
(74) *Attorney, Agent, or Firm* — Thomas Marquis; Kate Drakos; Micky Minhas

(57) ABSTRACT

The present invention discloses methods and systems for providing secure user access to services offered by a service provider to a client application over a network. One embodiment includes receiving an application cookie from the client application and populating a service cookie based on information in the application cookie. Information in the service cookie is utilized as a basis for regulating a provision of services to the client application.

20 Claims, 5 Drawing Sheets

(56) References Cited

U.S. PATENT DOCUMENTS

| | | | | |
|---|---|---|---|---|
| 8,099,503 | B2 | 1/2012 | Yeates et al. | |
| 2002/0077944 | A1 | 6/2002 | Bly et al. | |
| 2002/0099824 | A1 | 7/2002 | Bender et al. | |
| 2002/0103712 | A1* | 8/2002 | Rollins et al. | 705/26 |
| 2002/0143981 | A1 | 10/2002 | DeLima et al. | |
| 2003/0005118 | A1 | 1/2003 | Williams | |
| 2003/0005308 | A1 | 1/2003 | Rathbun et al. | |
| 2003/0009540 | A1 | 1/2003 | Benfield et al. | |
| 2003/0055883 | A1 | 3/2003 | Wiles | |
| 2003/0084296 | A1 | 5/2003 | Kyojima et al. | |
| 2003/0084302 | A1 | 5/2003 | de Jong et al. | |
| 2003/0101338 | A1 | 5/2003 | Mullen et al. | |
| 2003/0145205 | A1* | 7/2003 | Sarcanin | 713/172 |
| 2003/0149900 | A1 | 8/2003 | Glassman et al. | |
| 2003/0177351 | A1 | 9/2003 | Skingle | |
| 2003/0200465 | A1 | 10/2003 | Bhat et al. | |
| 2004/0059941 | A1 | 3/2004 | Hardman et al. | |
| 2004/0193605 | A1 | 9/2004 | Weisman et al. | |
| 2004/0260754 | A1 | 12/2004 | Olson et al. | |

OTHER PUBLICATIONS

Fu et al., K., "Dos and Don'ts of Client Authentication on the Web," MIT Lab. for Computer Science, Proc. 10th USENIX Security Symposium, 2001.
Park et al., J. "Role-based Access Control on the Web Using LDAP," IFIP Workshop on Database Security, 1999.
"mPollux Cookie Security Option," Fujitsu SDA, Version 2.6., Dec. 2003.
Park et al., J. "RBAC on the Web by Secure Cookies," IFIP Workshop on Database Security, 1999.
Beresnevichiene, Y. "A Role and Context Based Security Model," Technical Rpt. No. 558, U. of Cambridge, Computer Laboratory, Jan. 2003.
Application entitled, "System and Methods for Enhancing Security of Communication Over a Public Network," U.S. Appl. No. 10/725,881, filed Dec. 2, 2003.
Advisory Action dated Jan. 15, 2008 for related U.S. Appl. No. 10/744,920, filed Dec. 23, 2003. 3 pgs.
Advisory Action dated Jun. 2, 2009 for related U.S. Appl. No. 10/744,920, filed Dec. 23, 2003, 3 pgs.
Amendment After Final filed May 26, 2009 for related U.S. Appl. No. 10/744,920, filed Dec. 23, 2003, 12 pgs.
Amendment After Final filed Dec. 31, 2007 for related U.S. Appl. No. 10/744,920, filed Dec. 23, 2003, 10 pgs.
Amendment filed Oct. 11, 2007 for related U.S. Appl. No. 10/744,920, filed Dec. 23, 2003, 11 pgs.
Amendment filed Feb. 3, 2011 for related U.S. Appl. No. 10/744,920, filed Dec. 23, 2003, 14 pgs.
Amendment filed Jun. 27, 2008 for related U.S. Appl. No. 10/744,920, filed Dec. 23, 2003, 9 pgs.
Amendment filed Dec. 19, 2008 for related U.S. Appl. No. 10/744,920, filed Dec. 23, 2003, 6 pgs.
Amendment filed Dec. 1, 2009 for related U.S. Appl. No. 10/744,920, filed Dec. 23, 2003, 8 pgs.
Final Office Action dated Feb. 22, 2010 for related U.S. Appl. No. 10/744,920, filed Dec. 23, 2003, 8 pgs.
Final Office Action dated Mar. 24, 2009 for related U.S. Appl. No. 10/744,920, filed Dec. 23, 2003, 9 pgs.
Final Office Action dated Apr. 13, 2011 for related U.S. Appl. No. 10/744,920, filed Dec. 23, 2003, 21 pgs.
Final office Action dated Oct. 31, 2007 for related U.S. Appl. No. 10/744,920, filed Dec. 23, 2003, 12 pgs.
Notice of Allowance dated Sep. 26, 2011 for related U.S. Appl. No. 10/744,920, filed Dec. 23, 2003, 9 pgs.
Office Action dated Mar. 27, 2008 for related U.S. Appl. No. 10/744,920, filed Dec. 23, 2003, 12 pgs.
Office Action dated Jul. 11, 2007 for related U.S. Appl. No. 10/744,920, filed Dec. 23, 2003, 11 pgs.
Office Action dated Sep. 19, 2008 for related U.S. Appl. No. 10/744,920, filed Dec. 23, 2003, 12 pgs.
Office Action dated Sep. 1, 2009 for related U.S. Appl. No. 10/744,920, filed Dec. 23, 2003, 8 pgs.
Office Action dated Oct. 27, 2010 for related U.S. Appl. No. 10/744,920, filed Dec. 23, 2003, 12 pgs.
Amendment with RCE filed Jul. 24, 2009 for related U.S. Appl. No. 10/744,920, filed Dec. 23, 2003, 7 pgs.
Amendment with RCE filed Jun. 22, 2010 for related U.S. Appl. No. 10/744,920, filed Dec. 23, 2003, 14 pgs.
Amendment with RCE filed Jul. 7, 2011 for related U.S. Appl. No. 10/744,920, filed Dec. 23, 2003, 8 pgs.

* cited by examiner

METHODS AND SYSTEMS FOR PROVIDING SECURE ACCESS TO A HOSTED SERVICE VIA A CLIENT APPLICATION

CROSS-REFERENCE TO RELATED APPLICATION

The present application is a continuation application of and claims priority of U.S. patent application Ser. No. 10/744,920, filed Dec. 23, 2003, which issued on Jan. 17, 2012, as Pat. No. 8,099,503, the content of which is hereby incorporated by reference in its entirety.

BACKGROUND

The present invention generally pertains to systems and methods for accessing a hosted service over a network. More specifically, the present invention deals with methods for providing secure access to a hosted service via a client application.

The functionality of certain software applications can be extended through services offered through a network such as the Internet. Communication with the provider of services should be secure in order to protect the interests of both the host of the application and the service provider.

Retail management systems are a specific area where securing communication with a remote service provider is challenging. In order to achieve some degree of automation, retail businesses often implement a specialized software application. Many of these applications are point-of-sale solutions that enable at least partial automation of any of a number of processes such as customer tracking and inventory management. One example of such a software application is Microsoft Retail Management System (MRMS) provided by Microsoft Corporation of Redmond, Wash. Other examples of such software applications include back office systems, store room and shipping applications, MRMS Headquarters and warehouse management software.

It is common for retail management software applications to be installed on multiple computers (e.g., connected by a Local Access Network) that operate in conjunction with a central database. In some instances, extended functionality is available to the retail application in the form of remote services delivered by a service provider through the Internet. Such extended functionality may include, by way of example, payment card processing, integration with e-commerce web hosting or merchandising services. These and other services may be provided for free or based on a payment scheme involving, for example, subscription or per access based charges such as billing per transaction and metered billing (e.g. based on disk usage, quality/speed/level of service).

User access is an important area of consideration for many of the described and other remote service systems. For example, distributing appropriate access rights to different users in some customized manner (e.g., different employees or employee roles are assigned different access rights) is often a desirable capability.

Some hosted web services are only designed to support a single user login account per application account. This can be impractical in many environments, such as a retail sales environment wherein there is often a high turnover in staff and a need to provide access to multiple users (e.g. more than one person doing shipping of product sold on-line, different users on separate shifts, more than one person needed to update e-commerce website product listings). Furthermore, it is conceivable for a software application to provide its own user authentication system that eliminates the necessity of user authentication with a hosted service. It is desirable to provide "seamless" integration of an application and a hosted web service without requiring unnecessary log-in steps and password transactions. For example, it is undesirable to maintain and update separate employee user accounts for an on-line service.

SUMMARY

Embodiments of the present invention are directed towards methods and systems for providing secure user access to services offered by a service provider to a client application over a network. In one embodiment, an application cookie is received from the client application. A service cookie is then populated based on information in the application cookie. Information in the service cookie is utilized as a basis for regulating a provision of services to the client application.

DETAILED DESCRIPTION OF ILLUSTRATIVE EMBODIMENTS

It should be noted that to the extent that the present invention is described in the context of retail management applications and retail-oriented management web services and websites (often referred to as "Merchant Services"), this is just one example of an applicable context provided for the purpose of illustration to facilitate description. The present invention is not so limited. For example, the present invention can be extended to accommodate customer use (e.g. using a specific customer loyalty account rather than anonymous access) in a retail establishment. A customer could purchase (via smart phone, smart cart or in-store kiosk) and pick-up merchandise while in the retail establishment.

I. Illustrative Computing Environments

Prior to describing the present invention in detail, embodiments of illustrative computing environments within which the present invention can be applied will be described.

Figure 1:
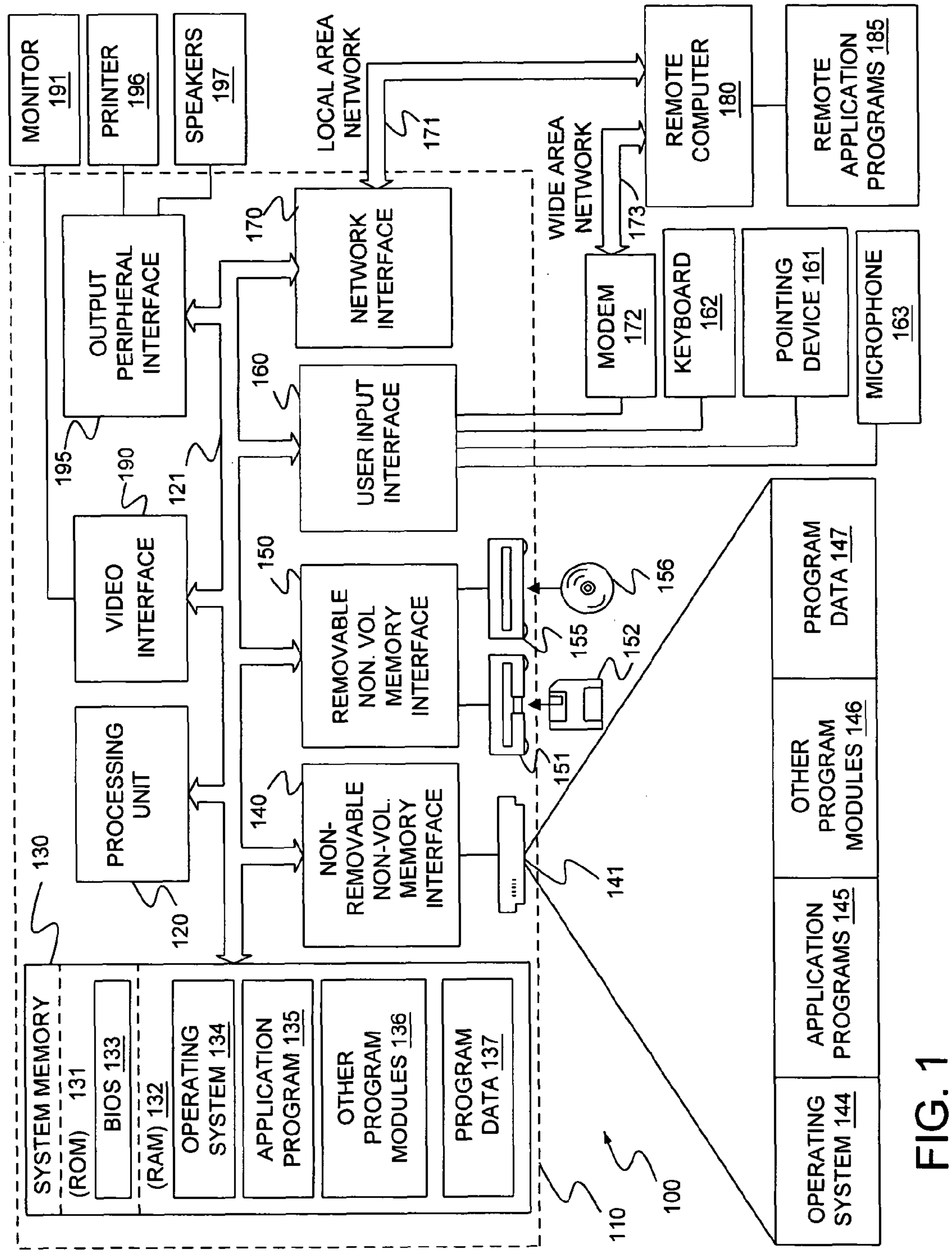
FIG. 1 is a schematic block diagram of a computing environment.

FIG. 1 illustrates an example of a suitable computing system environment 100 within which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, tablet computers, mainframe computers, distributed computing environments, smartphones, pocket PCs, Personal Data Assistants (such as those manufactured by Palm™), wearable computers that include any of the above systems or devices, and the like. Other suitable examples include various retail-oriented devices such as, but not limited to, self checkout systems, point-of-sale terminals, self-service kiosks, Electronic Cash Registers and Electronic Payment Terminals (e.g. veriphone terminals).

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus and Universal Serial Bus (USB).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, touch sensitive screen, magnetic strip reader, magnetic ink check reader, smart card reader, Rfid/AutoID reader, Bar-code scanner, number pad, electronic payment terminal (stand alone or connected to a terminal—e.g., via a network, USB or serial connection), electronic weighing scale, biometric security input device (e.g., eye scanner, thumb print reader, etc.), signature capture device or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. Remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks such as wireless networks. Such networking environments are commonplace in offices, enterprise-wide computer networks, intranets and the Internet. Applicable wireless networks also include, but are not limited to, wireless LAN/Wi-Fi, radio frequency using Bluetooth protocol and also IP over cellular (telephone) communications network.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

II. User Access Environment

Figure 2:
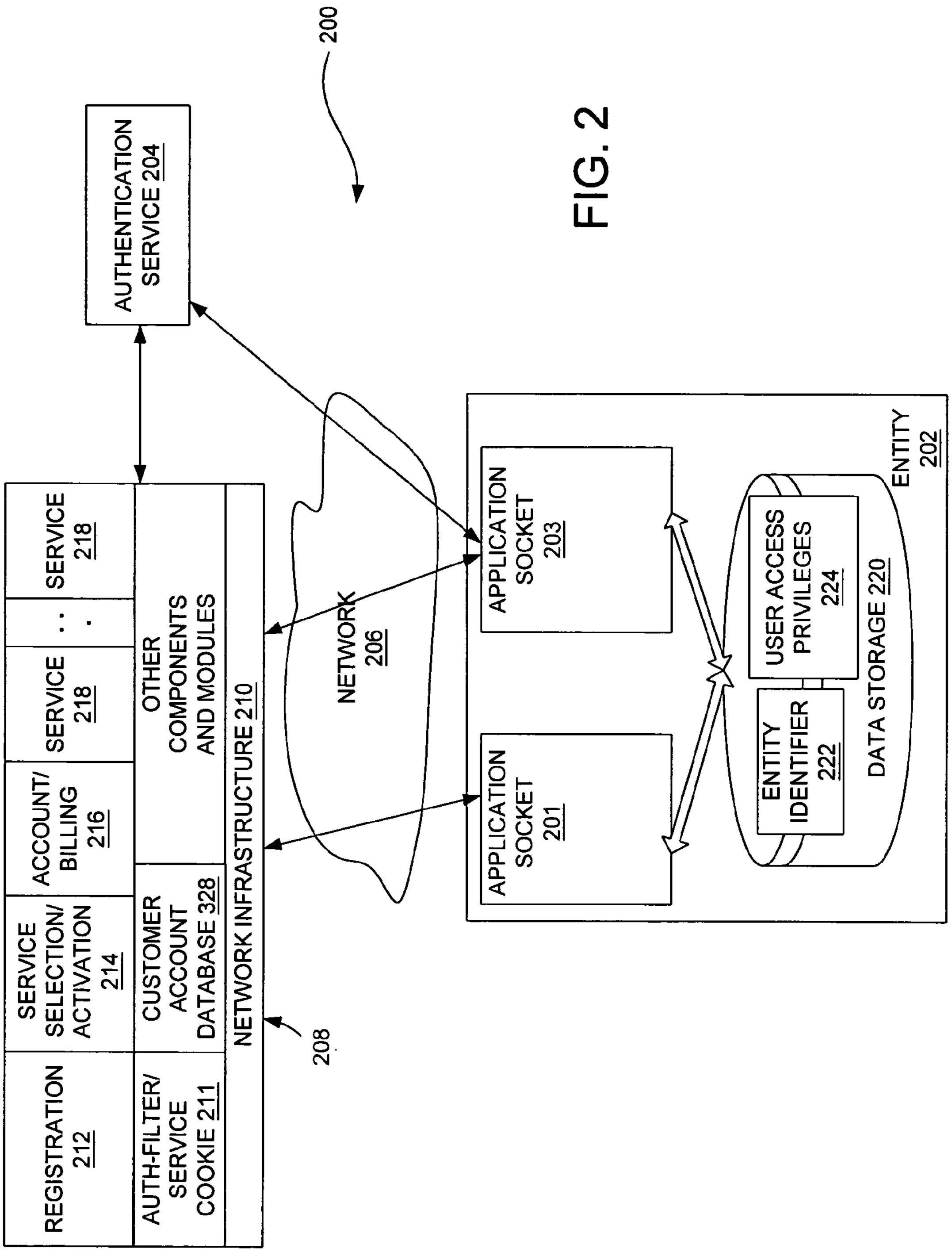
FIG. 2 is a block diagram of an example user access environment.

The present invention is not limited to any particular access environment. However, for the purpose of providing exemplary context, FIG. 2 is a block diagram of an example user access environment 200 within which embodiments of the present invention can be implemented.

Access environment 200 includes a service provider 208 configured to provide functional enhancement to a software application over a network 206. Within FIG. 2, the software application, which may actually be multiple software applications, is implemented on a plurality of computing devices identified as application sockets 201/203 affiliated with an entity 202. Entity 202 is illustratively, but not necessarily, a business organization or retailer. Sockets 201 and 203 can be different instances of the same application or multiple instances of different applications. Service provider 208 and sockets 201/203 are communicably connected to one another through a network 206 (e.g., the Internet).

The term "socket," as it is used herein, is intended to describe a device (e.g., any device described in relation to FIG. 1) connected to a network, such as network 206, directly or indirectly. Sockets will be described herein as running a software application, such as a retail management application. It should be noted that more than one relevant application can be run on any given socket, and any given socket may or may not run any particular application.

Service provider 208 includes a network infrastructure 210 for facilitating incoming and outgoing communication. Service provider 208 also includes registration module 212 that enables an application owner to register themselves and/or their application. A service selection/activation module 214 enables the owner to select, activate, and/or deactivate a delivery of services. An account/billing module 216 enables a billing process in order to charge the application owner for activated services. Web service provider 208 also includes deliverable services 218.

Provider 208 configured, in a traditional system, populates a service cookie based on information in a customer account database 228. For example, customer account database 228 can store information related to the merchant's registration, billing, authentication status and accessible services. Provider 208 also includes an authorization filter 211 (hereinafter auth-filter 211) configured to read and verify the service cookie upon attempts by an application user to access a deliverable service 218 or web user interface (e.g. html, asp or DHTML page). Auth-filter 211 illustratively facilitates a determination as to whether a user has authorization to access a particular service 218. It should be noted, however, that it is within the scope of the present invention that service provider 208 incorporate mechanisms other than auth-filter 211 to police user access and/or to process cookies.

In accordance with one embodiment, a business or retailer purchases a retail management application and installs it in a plurality of sockets, such as sockets 201 and 203. Of course, there could be more or less than the illustrated two sockets. One or more of the sockets can be a point-of-sale client application, while one other can be an administrative client application provided, for example, for management purposes (e.g., to a headquarters location). Sockets 201/203 are configured to store and retrieve data in conjunction with data storage 220. In FIG. 2, sockets 201/203 retrieve data in conjunction with a single data storage unit or centralized database. However, it is within the scope of the invention that sockets 201/203 can retrieve data from their own individualized data storage units or databases. In addition to data storage 220 being a database, data storage 220 can also be some sort of file, dedicated security storage or a smartcard.

Applications to which services can be delivered, and/or the owner of those applications, illustratively will register with service provider 208. An authorized representative, such as a system administrator (e.g. an owner or supervisor of a retail store or chain of stores), interacts with registration module 212 through network 206 to register the application and/or its owner. Module 212 illustratively verifies an appropriate application license or provides an interactive sign-up capability. Module 214 enables the administrator to activate or deactivate delivery of services 218. Module 216 facilitates billing for available or delivered services.

The registration process will generally result in creation of an entity (or merchant) account for entity 202. In some cases, an entity account identifier 222 (hereinafter entity identifier 222) is provided during the registration process. Entity identifier 222 is stored in data storage 220 and can take any of a variety of forms. For example, entity identifier 222 can be a security token, key, merchant identifier or GUID (Globally Unique Identifier) [#20]. It is also within the scope of the present invention to exchange the entity identifier information between service provider 208 and entity 202 by writing the entity identifier to application 201/203 or the user can write the entity identifier down and enter it into a user interface and/or application 201/203.

Traditionally, service provider 208 has been configured to provide services to users based on authentication with an authentication service 204. For example, when multiple services are provided, a centralized authentication service is often used. Generally speaking, service provider 208 has been configured to support one set of authentication service credentials per account (e.g., merchant credentials). Accordingly, authorization to access a provided service is demonstrated with a successful log-in with authentication service 204. Service 204 is illustratively a centralized service that enables multiple participating sites to authenticate a user with a single set of sign-in credentials. Service 204 can be, but is not limited to, MS-passport (or .NET passport) offered by Microsoft Corporation of Redmond, Wash.

In accordance with one embodiment of a traditional system, an application user accesses deliverable services 218 in association with a policing of access rights by auth-filter 211. When a user successfully logs-in with authentication service 204, service provider 208 is configured to populate a service cookie with authorization information that corresponds to the authorized authentication credentials. The service cookie is then verified by auth-filter 211 to police access rights.

Similarly, in accordance with one embodiment of a traditional system, a service cookie (e.g., an encrypted cookie) is utilized as an intermediate security mechanism. The service cookie is checked by auth-filter 211 (an ISAPI or HTTP-handler security filter) upon each attempt to access a secured service or web service user interface. The service cookie is generally populated after a user's account is validated using authentication service 204, as well as in view of restrictions imposed based on data associated with billing module 216, activation module 214 or some other source.

The described traditional remote service systems tend to be ill-suited for many application environments, such as retail sales application systems. These retail systems often involve providing application access to a broad, often-changing user pool. Accordingly, reliance on a single set of user credentials for authentication is not a particularly convenient feature within such an environment, especially when it is desirable to distribute access to offered services in some customized manner such as based on user identity or user role. Further, it is conceivable for a software application to provide its own user authentication system that at least partially eliminates the necessity of user authentication with a hosted service. Alternatively, operating system security or OS shell security (e.g., Windows, UNIX, LINUX) can support user accounts. In addition, group or role-based security can also be used with the present invention.

Within FIG. 2, for the purpose of illustration, data storage 220 includes user access privileges 224. Applications 201/203 are configured to reference and enforce user access privileges 224, for example, upon user log-in to the application, or upon a request for access to a service offered by provider 208. User access privileges 220 are illustratively a list of users or user accounts with corresponding role-based, group-based and/or identity-based access privileges. For example, the application applies a user's account information to determine what services or privileges the user is authorized to access. In accordance with one embodiment, a merchant account owner interacts with module 214 to selectively adjust access privileges 224.

III. User Access to a Service Provider Via a Client Application

The following embodiments of the present invention provide alternate solutions for policing access to services offered by a remote service provider.

Figure 3:
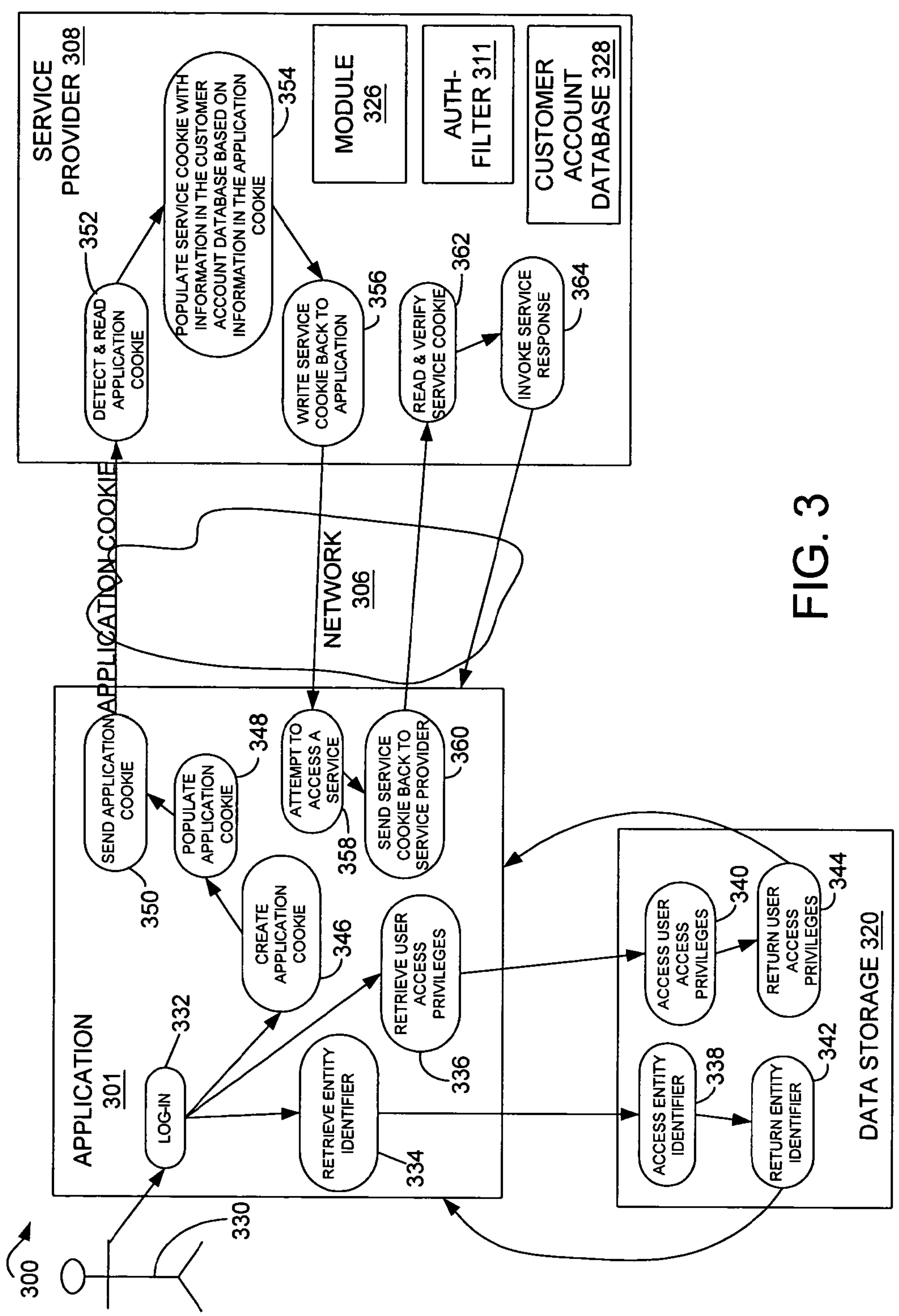
FIG. 3 is a schematic flow chart illustrating steps associated with accessing a service provider in accordance with an embodiment of the present invention.

FIG. 3 is a schematic flow chart 300 illustrating steps associated with accessing services offered by service provider 308 over network 306 in accordance with an embodiment of the present invention. The FIG. 3 architecture includes socket application 301 that is configured to interact with service provider 308 and data storage 320.

In one aspect of the present invention, user 330 logs-in to application 301, which is illustrated at block 332. Log-in authentication can be provided by the Operating System (OS) either at OS log-in or by application 301 leveraging the OS security. At log-in, the user acquires permission to enter application 301 based on the user's role or a user account. In addition, at log-in and illustrated in block 334, application 301 retrieves an entity identifier. As previously discussed, the entity identifier contains information related to the entity account or merchant account. Optionally or in addition to, application 301 can also retrieve user access privileges based on the user account and/or the user role as illustrated at block 336. Data storage 320 accesses the entity identifier and user access privileges at blocks 338 and 340. Data storage 320 returns the corresponding entity identifier and user access privileges to application 301 as illustrated in blocks 342 and 344.

In broad terms, the user access privileges define the access rights of individual users to access application features, functionality and/or resources, such as services offered by service provider 308. In accordance with one embodiment, a given user's rights to access an offered service are based upon the user's role within the entity (e.g., cashier, supervisor, manager, owner, stocker, shipping clerk, packer, etc.). In accordance with one embodiment, for example, all users of a certain role (e.g., cashier) are each given a user name/password combination that is associated with a set of access privileges which allows them to perform their role as an employee. It should be noted, however, that it is also within the scope of the present invention to distribute access privileges based on other parameters, such as, but not limited to, workstation identification.

An authorized user, such as an owner or supervisor, is illustratively empowered to configure and selectively assign user access privileges to appropriate application users and/or user roles. For example, access to credit card payment reporting and administrative services offered by web service 308 might be reserved for certain users (e.g., supervisors). Accordingly, the user accounts of these users are assigned the corresponding user access privileges. In accordance with one embodiment, the owner or supervisor must properly self-authenticate (e.g., log-in with a centralized authentication service) in order to make administrative changes to system settings.

As illustrated in block 346 of FIG. 3, application 301 creates an application cookie either in client code or via a hosted code. Although FIG. 3 illustrates application 301 creating the cookie after log-in, it is within the scope of the present invention to create the application cookie when the user attempts to access a service or web page from service provider 308, when the user logs-in (if either user or user role information is not needed) or when application 301 starts-up. In addition, the application cookie has a predetermined life span. For example, the application cookie can expire after a relatively short amount of time (e.g., one hour) or after a relatively long amount of time (e.g., one day). It is also within the scope of the invention to clear the application cookie. For example, the application cookie can be cleared when work with the service is completed, upon application exit (or user log-out) or upon application start-up. At block 348, the application cookie is populated with system information.

The precise nature of what is included in the application cookie will depend on a given system implementation. In accordance with one embodiment, the application cookie is populated with the entity identifier. In accordance with another embodiment, the application cookie is populated with a service identifier that is based on the user access privileges and includes information related to services the logged-in user has the authorization to access. In accordance with another embodiment, the application cookie is populated with user name or user role information. Of course, the application can be populated with more than one type of information. Generally speaking, the content of the application cookie is dependent on the system expectations of the service provider. For example, the application cookie might be populated with user name or user role information in a scenario wherein the service provider maintains an access log or audit trail for security purposes. Those skilled in the art will recognize that the above examples of information for population of the application cookie are not an exhaustive listing. Without departing from the scope of the present invention, the application cookie can be populated with other types of information.

At block 350, the populated application cookie is sent to service provider 308. Service provider 308 includes an account module 326. As illustrated in block 352, module 326 detects and reads the populated application cookie. Module 326 uses information in the application cookie to cross-reference with the service provider's customer account database 328. Customer account database 328 stores information (e.g., registration, billing, authentication status, access restrictions) for each merchant account. At block 354, module 326 populates a service cookie with information from the customer account database 328 based on the application cookie. At block 356, information in the service cookie is sent and/or written back to application 301. At block 358, the service cookie is received by application 301 and user 330 attempts to access a service from service provider 308. Application 301 sends the service cookie back to service provider 308 with the request to access a service at block 360. At block 362, the service cookie is intercepted by auth-filter 311 such that the auth-filter can read and verify the service cookie in order to provide access to services to application 301 on a restricted basis. In accordance with one embodiment, access restrictions are stored in customer account database 328 and reflected in the service cookie. In another embodiment, access restrictions are reflected in the service cookie, and are based on information in the application cookie such that access control depends upon role.

Auth-filter 311 is configured to police access rights to available services based on the information in the service cookie (e.g., information based on available services stored in customer account database 328 and/or information based on available services stored in the application cookie). If auth-filter 311 validates the currently requested service, then service provider 308 displays or invokes the requested service at block 364. If auth-filter 311 does not validate the currently requested service, service provider invokes or displays such a response at block 364. In addition, service provider 308 writes the service cookie back to application 301 at block 364. Therefore, FIG. 3 illustrates an example embodiment wherein upon each request from application 301 to access services, auth-filter 311 reads and verifies the service cookie to police access and service provider 308 writes the service cookie back to application 301 after auth-filter 311 verfies the service cookie.

Those skilled in the art should understand that service provider is not limited to providing services as discussed above, particularly through implementation of an auth-filter. Any other means for policing the provision of services based on information populated in the service cookie is within the scope of the present invention.

In accordance with one embodiment, the service cookie populated based on application cookie information is basically the same service cookie as used in a traditional system. In the context of the traditional system, the service cookie is populated with information in customer account database 328 based on information received from an authentication service. In the present embodiment, the service cookie is also populated with information from the customer account database, but, is based on information in the application cookie. Therefore, auth-filter 311 is the same auth-filter used in the traditional system. However, it is within the scope of the present invention to modify the service cookie for modified capability. It is also within the scope of the present invention to modify (or replace) the existing auth-filter and/or add an additional auth-filter as necessary to provide finer granularity and functionality for access control based on user role.

Figure 4:
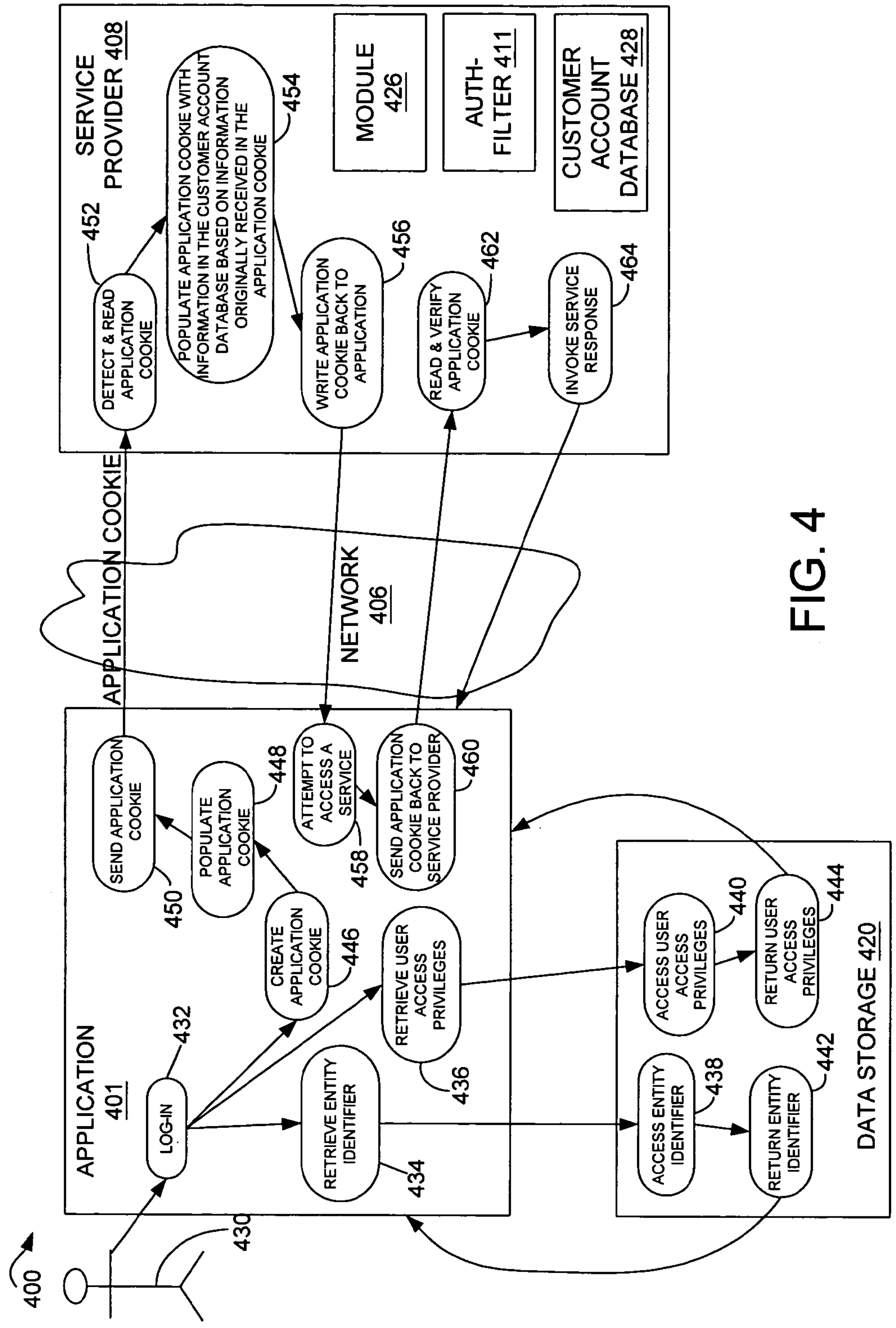
FIG. 4 is a schematic flow chart illustrating steps associated with accessing a service provider in accordance with an embodiment of the present invention.

FIG. 4 is a schematic flow chart 400 illustrating steps associated with accessing services provided by service provider 408 over network 406 in accordance with another embodiment of the present invention. The FIG. 4 architecture includes socket application 401 configured to interact with service provider 408 and data storage 420.

In another aspect of the present invention, user 430 logs-in to application 401 illustrated at block 432. At log-in, the user acquires permission to enter the application based on the user's role or a user account. In addition, at log-in and illustrated in block 434 application 401 retrieves an entity identifier. Optionally or in addition to, application 401 can also retrieve user access privileges based on user account and/or user role as illustrated at block 436. Data storage 420 accesses the entity identifier and user access privileges at blocks 438 and 440. Data storage 420 returns the corresponding entity identifier and user access privileges to the application as illustrated in blocks 442 and 444.

As illustrated in block 446 of FIG. 4, application 401 creates an application cookie either in client code or via a hosted code. As previously discussed in FIG. 3, application 401 can create a cookie after log-in, when the user attempts to access a service or web page from service provider 408, when the user logs-in (if either user or user role information is not needed) or when application 401 starts-up. In addition, it is also within the scope of the present invention to clear or delete the application cookie. At block 448, the application cookie is populated with system information as discussed in FIG. 3. Similar to the FIG. 3 embodiment, the application cookie can contain information related to an entity identifier, a service identifier based on user access privileges, a user role, user identity, etc.

At block 450, the populated application cookie is sent to service provider 408. Service provider 408 is similar to service provider 308, except for the fact that provider 408 is configured to police access to services based on direct acceptance of the application cookie. In other words, the step of generating the service cookie with information from customer account database 428 based on the application cookie has essentially been eliminated. Service provider 408 includes an account module 426. As illustrated in block 452, module 426 detects, reads and accepts the populated application cookie. Module 426 uses information in the application cookie to cross-reference with the service provider's customer account database 428 similar to customer account database 328. However, module 426, at block 454, populates the application cookie with information from customer account database 428 based on the information originally received in the application cookie. At block 456, the application cookie is sent and/or written back to application 401 with information from customer account database 428. At block 458, the application cookie is received by application 301 and user 330 attempts to access a service from service provider 308. Application 301 sends the application cookie back to service provider 308 and the request to access a service at block 460. At block 462, the application cookie is intercepted by a specialized auth-filter 411 that is configured to accept, read and verify the application cookie. In accordance with one embodiment, the auth-filter of a traditional system (e.g., one designed to apply the service cookie) is altered to directly accept and act upon the application cookie. In accordance with another embodiment, an additional application cookie-specific auth-filter is provided to work in conjunction with the existing service cookie-specific auth-filter. Regardless of the type of auth-filter, auth-filter 411 polices access rights to available service based on the information in the application cookie. If auth-filter 411 validates the currently requested service, then service provider 308 displays or invokes the requested service at block 464. If auth-filter does not validate the currently requested service, service provider 408 displays or invokes such a response. Again, the present application is not limited to an auth-filter implementation.

It is also within the scope of the present invention for application 401 to send the application cookie to service provider 408 and auth-filter 411 reads and validates the application cookie outright. Thus, this embodiment eliminates the steps of detecting the application by module 426 and cross-referencing the application cookie with customer database 428. This embodiment assumes that application 401 is to be trusted and a subscription check is not required (e.g. when charges are per transaction based on an entity identifier in the application cookie).

In accordance with one embodiment, the traditional functionality based on a single set of user authentication credentials is maintained. For example, a merchant account holder can still access services through log-in with an authentication service (e.g., logging into Microsoft bCentral provided by Microsoft Corporation of Redmond, Wash. using Microsoft Passport). The owner's authentication credentials are read by the service provider and cross-referenced with the customer account database. The service provider populates the service cookie with information from the customer account database based on the owner's authentication credentials, and service access is provided based on restrictions reflected in the service cookie. In other words, the traditional service cookie is populated with the owner's access rights.

It is conceivable that some traditional service modules might require authentication credential information. Accordingly, by retaining the authentication credential functionality, these modules can still be supported. With the credentials, the billing module or other modules in the service provider, can continue to verify account information with authentication credential information. In accordance with one embodiment, authentication credential information is catalogued at the service provider such that other information in an application cookie (or service cookie) can be utilized to look up corresponding credential information to be provided to a module. Alternatively, the look up could be carried out in cooperation with a centralized authentication service.

It should be noted that it is within the scope of the present invention to incorporate alternative means (other than cookie means) to transfer data between the application and the service provider. Examples include: a query string, .NET/SOAP service call, custom protocol over SSL (security socket layer) and form post. In addition, it is within the scope of the present invention to incorporate means to guarantee trust between the application and the service provider. For example, incorporating trust can include simple encryption (e.g., PKI key encryption, static encryption, etc.), invocation of http (hyper text transfer protocols) and/or digital certificates.

In accordance with one embodiment of the present invention, the service provider is configured to receive system information from the application as part of a service call or web service call to populate the service cookie. In one case, the service call is invoked over http. Alternatively or in addition to, the service call is a certificate-protected service call using digital certificates and/or WSA/GXA technologies.

Figure 5:
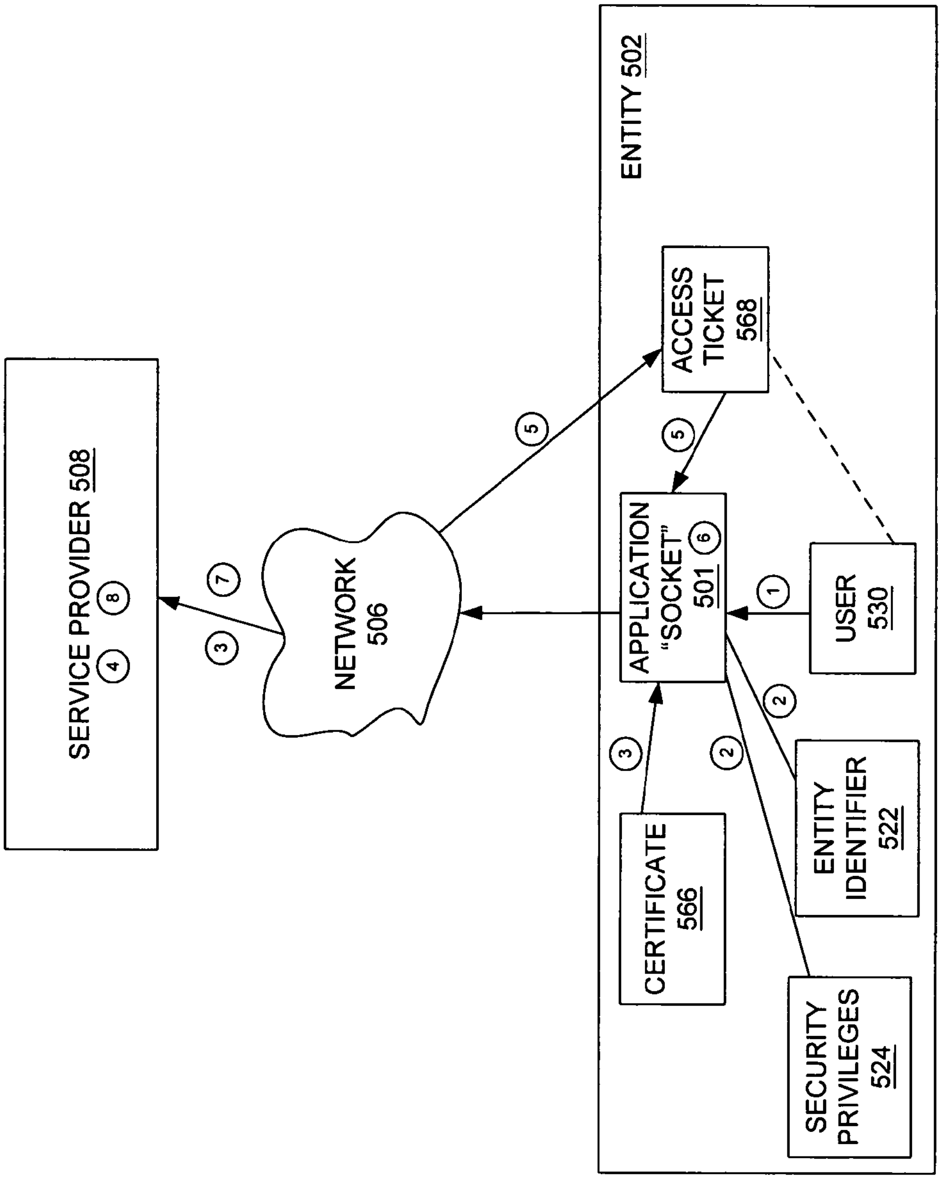
FIG. 5 is a block-flow diagram illustrating example steps associated with guaranteeing trust between an application and a service provider.

In accordance with one embodiment of the present invention, FIG. 5 is a block-flow diagram illustrating a series of steps associated with guaranteeing trust between application "socket" 501 and service provider 508 utilizing a digital certificate. The steps are numbered 1-8 for simplicity.

The first step is local authentication of user 530 (associated with entity 502) with application 501. The first step also includes a request to application 501 to use a web service. The second step is application of user access privileges 524 as necessary and application of entity identifier 522. The third step is transfer of certificate 566 and system information based on service provided by service provider 508 (e.g. entity identifier and/or user access privileges) through a service call across network 506 to service provider 508. Service provider 508 performs step 4 by validating account and entity identity information with a service cookie, customer account database and an auth-filter. In addition, service provider 508 creates a session ticket and encrypts the session ticket with the public key in certificate 566 (and with the service key if necessary). In accordance with step five, the encrypted access ticket (labeled 568), is returned to application 501. In accordance with step six, the session ticket is decrypted with the private key that corresponds to the certificate public key. In accordance with step seven, a command to perform a service task and the decrypted session ticket are transmitted to service provider 508. Communication over a secure channel or extra encryption can be implemented to secure this described transfer of security data.

In accordance with step eight, the session ticket is decrypted with the service key if necessary, and validated if necessary. Assuming everything is in order, the requested service is then delivered to user 530 through application socket 501.

Although the present invention has been described with reference to preferred embodiments, workers skilled in the art will recognize that changes may be made in form and detail without departing from the spirit and scope of the invention.

What is claimed is:

1. A method of selectively providing a retail management service over a computer network, the method comprising:

receiving an application cookie from a point-of-sale application, the application cookie identifying a particular user role associated with a user of the point-of-sale application;

accessing a services data store to determine at least one retail management service based on the particular user role identified in the application cookie, the retail management service providing retail management functionality for the point-of-sale application over the computer network;

populating, using a computer processor, a service cookie based on the application cookie received from the point-of-sale application, the service cookie being populated with information identifying that the retail management service is available to a user of the point-of-sale application having the particular user role;

transmitting the populated service cookie to the point-of-sale application;

receiving, from the point-of-sale application, a request to access the retail management service, the request including the service cookie;

verifying the service cookie received with the request; and providing the point-of-sale application access to the retail management functionality of the retail management service based on the verification of the service cookie.

2. The method of claim 1, wherein populating the service cookie further comprises cross-referencing the particular user role with information in the services data store to determine that the retail management service is available to the user.

3. The method of claim 1, wherein the service cookie identifies the particular user role but does not identify the user specifically.

4. The method of claim 1, wherein the application cookie includes a merchant identifier that identifies a merchant associated with the point-of-sale application, and the service cookie is populated based on the merchant identifier.

5. The method of claim 1, wherein providing the retail management service further comprises providing the retail management service so as to be consistent with a scope of services identified in the populated service cookie.

6. The method of claim 1, wherein the application cookie is generated by the point-of-sale application.

7. The method of claim 1, wherein the application cookie received from the point-of-sale application comprises a service identifier that is based on user access privileges and includes information related to services the user of the point-of-sale application has authorization to access.

8. A method of selectively providing a service over a computer network, the method comprising:

receiving, at a service provider, user role information from a client application that identities a particular role associated with a user of the client application;

determining, at the service provider based on the user role information received from the client application, a service that is available to the user having the particular role;

populating, at the service provider using a computer processor, a cookie with an indication that the service is available to the user having the particular role;

transmitting the cookie from the service provider to the client application;

receiving, at the service provider, a request to access the service from the client application; and verifying the cookie and, upon verification, providing the service to the client application.

9. The method of claim 8, wherein populating the cookie further comprises cross-referencing the particular role with information in a database to determine that the service is available to the user.

10. The method of claim 8, wherein the indication identifies the particular role but does not identify the user specifically.

11. The method of claim 8, wherein receiving the request to access the service further comprises receiving the cookie in conjunction with the request.

12. The method of claim 8, wherein providing the service further comprises providing the service so as to be consistent with a scope of services identified in the cookie.

13. The method of claim 8, wherein the cookie is populated based at least in part on information derived from a second cookie that comprises an application cookie.

14. A computing system comprising:

a client application;

a user interface component configured to generate a user interface display of the client application with user input mechanisms that receive a user input that provides user credentials from a user of the client application, wherein the client application identifies user role information and user access privileges of the user based on the user credentials provided by the user input and generates a data message that is populated with the user role information and user access privileges; and a service provider interface component configured to:

transmit the generated data message to a service provider over a computer network;

receive, from the service provider over the computer network, a service cookie that is populated with information based on the data message and identifies that the retail management service is available to the user of the client application;

transmit a request for the retail management service over the computer network to the service provider, wherein the request for the retail management service transmitted to the service provider includes the service cookie; and receive the retail management service from the service provider.

15. The computing system of claim 14, wherein the user input provides user log-in information, and wherein the data packet comprises an application cookie and the service cookie is populated based on information included within the application cookie.

16. The computing system of claim 14, wherein the data message comprises an application cookie, the service cookie is populated by the service provider based on information in the application cookie.

17. The computing system of claim 14, wherein the client application comprises a point-of-sale application and the service provider is remote from the point-of-sale application.

18. The computing system of claim 17, wherein the application cookie includes a merchant identifier that identifies a merchant associated with the point-of-sale application.

19. The computing system of claim 14, wherein the application cookie is populated with a service identifier that identifies the retail management service.

20. The computing system of claim 14, further comprising:

an authentication component configured to authenticate the user, determine a role associated with the authenticated user, and include an indication of the role in the application cookie.

* * * * *